United States Patent
Dijkmans

(10) Patent No.: US 6,961,389 B2
(45) Date of Patent: Nov. 1, 2005

(54) DIGITAL TRANSMISSION SYSTEM FOR TRANSMITTING A DIGITAL AUDIO SIGNAL BEING IN THE FORM OF SAMPLES OF A SPECIFIC WORDLENGTH AND OCCURRING AT A SPECIFIC SAMPLING RATE

(75) Inventor: Eise C. Dijkmans, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 835 days.

(21) Appl. No.: 09/811,641

(22) Filed: Mar. 19, 2001

(65) Prior Publication Data

US 2001/0010711 A1 Aug. 2, 2001

Related U.S. Application Data

(63) Continuation of application No. 08/754,660, filed on Nov. 21, 1996, now Pat. No. 6,272,182.

(30) Foreign Application Priority Data

Nov. 21, 1995 (EP) .............................................. 95203196

(51) Int. Cl.[7] .......................................... H04L 27/04
(52) U.S. Cl. ..................................................... 375/295
(58) Field of Search ............................... 375/240–242, 375/244, 247, 259, 295, 355; 704/200, 201, 205, 229, 254, 500, 501, 504; 341/126, 143, 144; 370/477

(56) References Cited

U.S. PATENT DOCUMENTS

| | | | | |
|---|---|---|---|---|
| 5,225,787 A | * | 7/1993 | Therssen | 327/113 |
| 5,323,396 A | * | 6/1994 | Lokhoff | 370/468 |
| 5,627,536 A | * | 5/1997 | Ramirez | 341/141 |
| 5,719,571 A | * | 2/1998 | Akune et al. | 341/61 |

* cited by examiner

Primary Examiner—Don N. Vo
(74) Attorney, Agent, or Firm—Michael E. Belk

(57) ABSTRACT

A digital transmission system is disclosed having a transmitter and a receiver for transmitting and receiving a digital audio signal. The digital audio signal is in the form of samples of a specific wordlength and occurring at a specific sampling rate. The transmitter including an input terminal for receiving the digital audio signal and for receiving a first information word having a relationship with the specific wordlength and a second information word having a relationship with the specific sampling rate. A formatting unit is present far combining the digital audio signal and the first and second information words into a serial datastream suitable for transmission via a transmission medium. The wordlength of the samples in the digital audio signal, expressed in number of bits, being equal to n, where n is an integer larger than zero, and the sampling rate is equal to $2^p.F_s$, where p is an integer larger than zero and $F_s$ is equal to a frequency value taken from a group of at least two frequency values, said group of frequency values including 44.1 kHz and 48 kHz.

Figure 1:
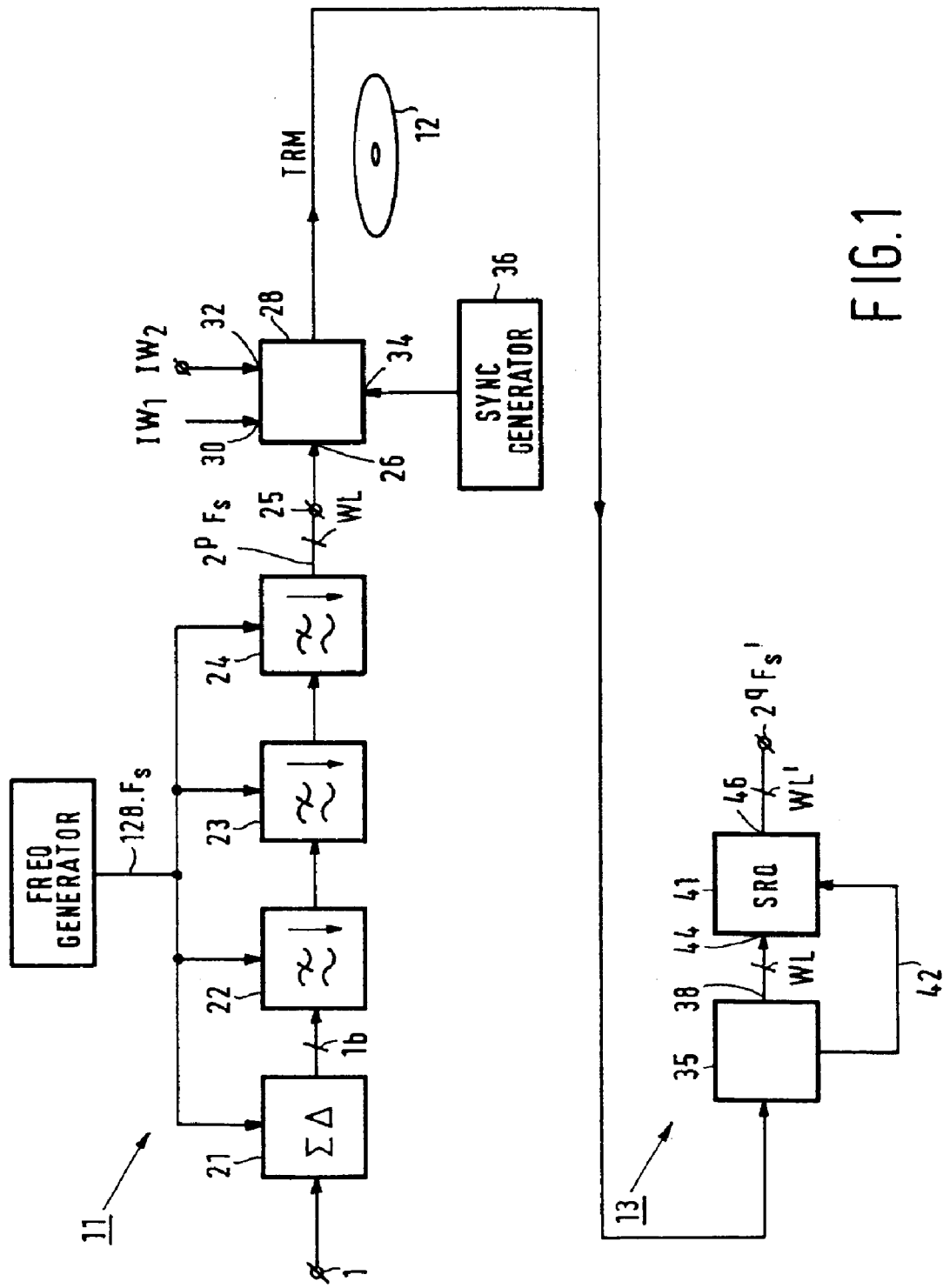

The receiver comprises a sample rate converter for converting the sampling rate of the signal received.

23 Claims, 2 Drawing Sheets

DIGITAL TRANSMISSION SYSTEM FOR TRANSMITTING A DIGITAL AUDIO SIGNAL BEING IN THE FORM OF SAMPLES OF A SPECIFIC WORDLENGTH AND OCCURRING AT A SPECIFIC SAMPLING RATE

This application is a continuation of Ser. No. 08/754,660 filed Nov. 21, 1996 now U.S. Pat. No. 6,272,182.

The invention relates to a digital transmission system having a transmitter and a receiver for transmitting and receiving a digital audio signal, the digital audio signal being in the form of samples of a specific wordlength and occurring at a specific sampling rate. The invention further relates to a transmitter for use in the transmission system, a receiver for use in the transmission system, to a record carrier obtained with the transmitter and to a transmission signal.

A transmission system as defined in the opening paragraph is known from U.S. Pat. No. 5,323,396, document D1 in the list of related documents that can be found at the end of this description.

The transmitter includes a subband encoder which splits a wideband digital audio signal into a plurality of subband signals, carries out a quantization on the subband signals based on a psychoacoustic masking model so as to obtain a data reduction on the amount of audio information to be transmitted. Subsequently, the quantized subband signals are combined into a composite transmission signal so as to enable transmission. Together with the data reduced audio information, an information word relating to the sampling frequency of the wideband digital audio signal is transmitted in order to regenerate the wideband digital audio signal with the same sampling frequency upon reception.

The invention aims at providing a transmission system as per the opening paragraph which is capable of processing and transmitting audio signals having a wide range of sampling frequencies and wordlengths of the samples of the wideband digital audio signal.

It is a further object of the invention to enable the reception of those transmitted audio signals, with the possibility to convert the sampling frequencies of such audio signals to a desired sampling frequency in a receiver.

The transmission system in accordance with the invention has a transmitter and a receiver for transmitting and receiving a digital audio signal, the digital audio signal being in the form of samples of a specific wordlength and occurring at a specific sampling rate, the transmitter comprising input means for receiving the digital audio signal and for receiving a first information word having a relationship with the specific wordlength and a second information word having a relationship with the specific sampling rate, formatting means for combining the digital audio signal and the first and second information words into a serial datastream suitable for transmission via a transmission medium, the wordlength of the samples in the digital audio signal, expressed in number of bits, being equal to n, where n is an integer larger than zero, and the sampling rate being equal to $2^p.F_s$, where p is an integer larger than zero and $F_s$ is equal to a frequency value taken from a group of at least two frequency values, said group of frequency values including 44.1 kHz and 48 kHz.

It is a further object of the invention to carry out a data compression step on the digital audio signal which is not based on a subband coder data compression step. Preferably, the data compression step is a lossless data compression step, such as a variable length coding, a Huffman coding, an arithmetic encoding or a Lempel-Ziv encoding. Such data compression steps are much simpler to realize, compared to the subband coding algorithm known from the prior art.

Figure 2:
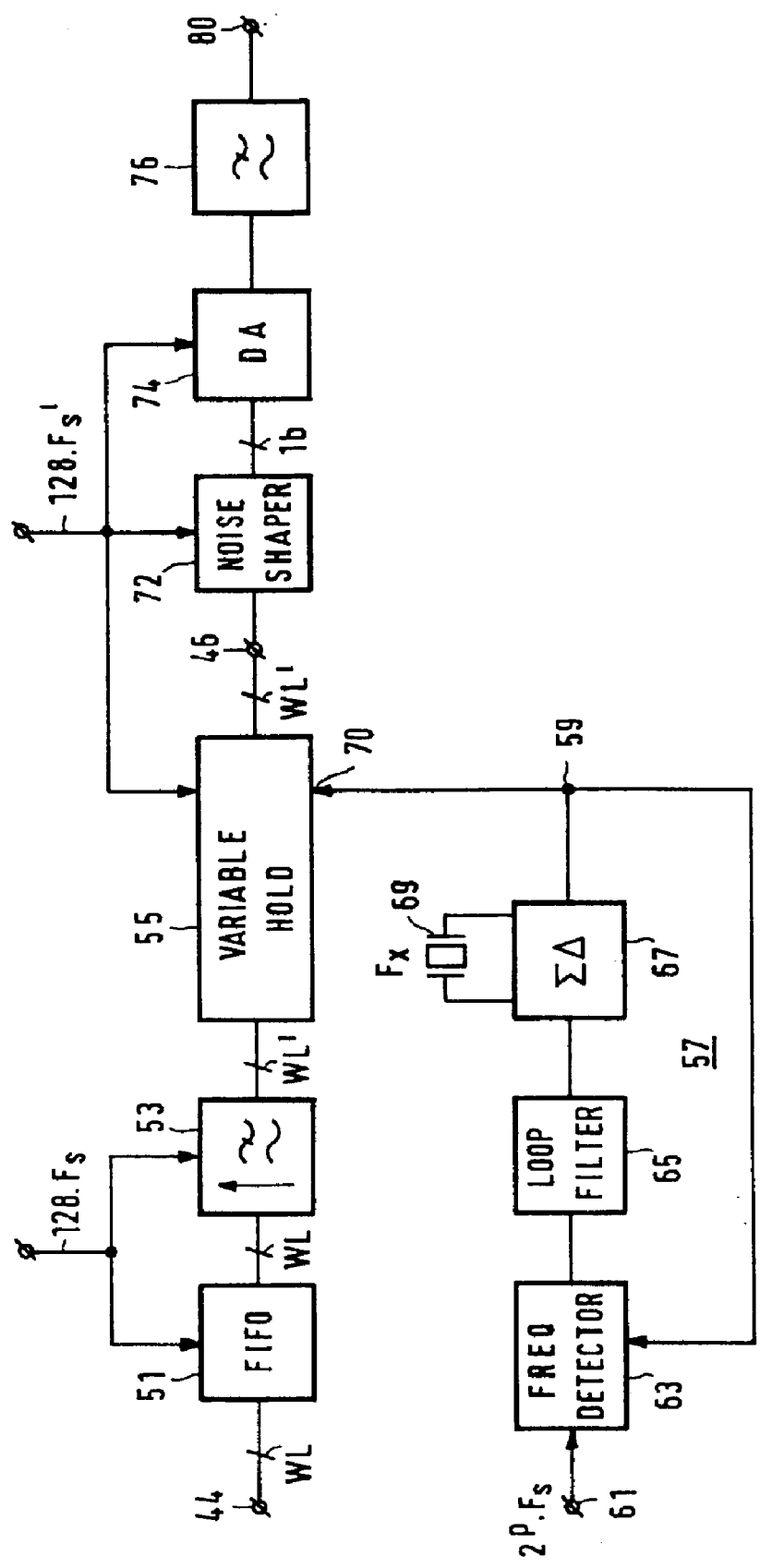

These and other aspects of the invention will become apparent from and elucidated further with reference to the embodiments described in the following figure description, in which FIG. 1 shows the transmission system in accordance with the invention, and FIG. 2 shows a further elaboration of part of the receiver in the system.

FIG. 1 shows a digital transmission system in accordance with the invention, comprising a transmitter 11 for transmitting a digital audio signal via a transmission medium TRM, such as a information carrier 12, to a receiver 13. An analog audio signal is supplied to an input terminal 1 of the transmitter 11, which input terminal 1 is coupled to an input of a sigma-delta modulator 21. Under the influence of a very high sampling frequency of $N.F_s$, where $F_s$ equals 48 kHz or 44,1 kHz, or in exceptional cases 32 kHz, and where N could be chosen equal to 128, the sigma-delat modulator 21 converts the analog audio signal into samples with a limited wordlength ranging from 6, as an example, to preferably 1 bit. In the further description it will be assumed that the sigma delta modulator 21 generates a 1-bit bitstream signal. Converting an analog audio signal into a 1-bit bitstream signal has a number of advantages. Bitstream conversion is a high quality encoding method, with the possibility of a high quality decoding or a low quality decoding using a simpler decoding circuit. Reference is made in this respect to the publications 'A digital decimating filter for analog-to-digital conversion of hi-fi audio signals', by J. J. van der Kam, document D2 in the list of related documents, and 'A higher order topology for interpolative modulators for oversampling A/D converters', by Kirk C. H. Chao et al, document D3 in the list of related documents.

The bitstream signal is supplied to at least one lowpass filter and down sampler unit. In the embodiment of FIG. 1, a series arrangement of three lowpass filter and down sampler units 22, 23 and 24 are present, all clocked with the $128.F_s$ clock frequency, or derivations thereof. The lowpass filter and down sampler unit 22 comprise a lowpass filter that filters out the lowest ⅛-th part of the frequency band of interest of the bitstream signal, which is $64.F_s$ Hz, to a bandwidth of $8.F_s$ Hz and down samples the bitstream signal by a factor of 8, so as to obtain an output signal with a sampling rate of $16.F_s$. The lowpass filter and down sampler unit 23 in the same way comprise a lowpass filter that halves the frequency band of interest of the output signal of the unit 22, which is now $8.F_s$ Hz, to a bandwidth of $4.F_s$ Hz and down samples this signal by a factor of 2, so as to obtain an output signal with half the sampling rate of $8.F_s$. The lowpass filter and down sampler unit 24 in the same way comprise a lowpass filter that halves the frequency band of interest of the output signal of the unit 23, which is now $4.F_s$ Hz, to a bandwidth of $2.F_s$ Hz and down samples this signal by a factor of 2, so as to obtain an output signal with half the sampling rate of $4.F_s$.

Thus, at the output of the unit 24, a digital audio signal is available having a sampling rate of $4.F_s$ and a wordlength, expressed in number of bits, equal to WL. This wordlength WL can have any value, dependent of the accuracy of calculation in the units 22, 23 and 24. As an example, WL could be equal to 24.

It should thus be noted that the digital audio signal present at the terminal 25 has a wordlength and a sampling rate, which is dependent of the choice made by the provider of the digital audio signal. The provider may prefer the value 44.1 kHz to be chosen for $F_s$. Other providers of audio software may prefer 48 kHz to be chosen for $F_s$. Further, a provider may choose more or less lowpass filter and down sampler units to be used in order to derive the digital audio signal from the bitstream signal present at the output of the converter 21. It should however be noted that, in accordance with the invention, the sampling rate of the digital audio signal applied to the terminal 25 has a sampling rate which equals $2^p.F_s$, where p is an integer larger than zero and $F_s$ is equal to a frequency value taken from a group of at least two frequency values, said group of frequency values including 44.1 kHz and 48 kHz. In exceptional circumstances, $F_s$ may be chosen equal to 32 kHz.

The digital audio signal present at the terminal 25 is supplied to an input 26 of a signal combination unit 28. The combination unit 28 has further inputs 30, 32 and 34 for receiving a first information word $IW_1$, a second information word $IW_2$ and a sync word, respectively. The first information word is representative of the wordlength WL with which the samples of the digital audio signal are supplied to the input 26 and the second information word is representative of the sampling rate, in the above example $4.F_s$, of the digital audio signal supplied at the input 26.

Sync words are supplied to the input 34 by a sync word generator 36. The combination unit 28 combines the information words $IW_1$ and $IW_2$ and the samples of the digital audio signal supplied to the input 26 into a composite signal. Sync words are added to the composite signal and, where necessary, an error correction encoding step and a channel encoding step are applied to the composite signal so as to obtain a transmission signal in the form of a serial datastream, suitable for transmission via the transmission medium TRM (the disk 12).

The combination of the various input signals of the combination unit 28 into a composite signal can be realized by generating blocks of samples comprising a sync word and a plurality of samples, where the information words are stored in each block of samples. The error correction encoding step and the channel encoding step may be carried out on the samples only, or on the samples including the information words in a block.

Further, prior to error correction encoding and/or channel encoding, a substantially lossless data compression step could be carried out on the samples of the digital audio signal applied to the input 26. Lossless coders have the advantage that they can data compress the audio signal in such a way that, after data expansion by a lossless decoder, the original residual bitstream signal can be reconstructed in a substantially lossless way. That means that there is substantially no loss of information after compression-expansion. Lossless coders can be in the form of a variable length coder. Variable length coders are well known in the art. Examples of such variable length coders are Huffman coders, arithmetic coders and Lempel-Ziv coders. Reference is made in this respect to the publications 'A method for the construction of minimum-redundancy codes' by D. A. Huffman, document D5 in the list of related documents, 'An introduction to arithmetic coding' by G. G. Langdon, document D6 in the list of related documents, and 'A universal algorithm for sequential data compression' by J. Ziv et al, document D7 in the list of related documents.

The transmission medium TRM can be a RF link, or a record carrier, such as an optical disk or a magnetic record carrier, or even a solid state memory.

Via the transmission medium TRM, the transmission signal is supplied to the receiver 13. The receiver comprises a detector unit 35 for retrieval of the transmission signal from the transmission medium TRM. The receiver 13 further comprises a sample rate converter 41, well known in the art. Reference is made in this respect to U.S. Pat. No. 5,225,787, document D4 in the list of related documents.

The detector unit 35 is adapted to retrieve the first and second information words from the serial datastream and to retrieve the digital audio signal from the serial datastream using the first information word. As a result, samples of the digital audio signal having the wordlength WL are supplied at the output 38 with a sampling rate substantially equal to $2^p.F_s$, which is in the present example $4.F_s$. The second information word, representative of the sampling frequency of the digital audio signal is supplied via the line 42 to the sample rate converter 41 to control the conversion in the sample rate converter 41.

The sample rate converter 41 is adapted to convert the sampling rate of the samples in the digital audio signal supplied to its input 44 from the sampling rate defined by the second information word $IW_2$ into a second sampling rate so as to obtain an in sample rate converted digital audio signal, which is supplied to an output 46. The second sampling rate is equal to $2^q.F_s'$, where q is an integer larger than zero and $F_s'$ is equal to a frequency value taken from a group of at least two frequency values, said group of frequency values including 44.1 kHz and 48 kHz. In exceptional cases $F_s'$ can be chosen equal to 32 kHz. Preferably, $F_s'$ is 48 kHz, as sample rate conversion from a lower frequency $F_s$ (eg. equal to 44.1 kHz) to a higher frequency $F_s'$ can be realized in a simpler way, with simpler filters. The wordlength WL' of the samples supplied at the output 46 need not be the same as the wordlength WL of the samples of the digital signal received.

FIG. 2 shows a further elaborated version of the sample rate converter 41. The converter 41 comprises a first-in-first out shiftregister 51, an upsampling filter unit 53 and a variable hold circuit 55. Further, a control signal generator 57 is present for generating a control signal at an output 59 to control the variable hold circuit 55. The receiver comprises a frequency generator (not shown) that generates a clock frequency $128.F_s$, in response to the information word $IW_2$ received, to control the FIFO 51 and the upsampling filter 53. Further, this frequency generator generates the frequency $2^p.F_s$ which is supplied to an input 61 of the control signal generator 57, which has the form of a digital control loop. The loop 57 comprises a frequency detector 63, a loop filter 65 and a sigma delta modulator 67.

The samples of the digital audio signal retrieved from the transmission signal by the detector 35 are supplied to the input of the FIFO 51. The FIFO 51 is required in order to account for variations in the rate with which the samples are retrieved from the transmission medium and supplied by the detector 35 so as to obtain a datastream of samples at the output of the FIFO 51 having a sampling rate of $2^p.F_s$, which in the present example equals $4.F_s$. The upsampling filter 53 upsamples the digital audio signal, eg. to a sampling rate of $64.F_s$. The wordlength WL' of the samples at the output of the filter 53 may be larger than the wordlength WL.

The upsampled digital audio signal is supplied to the input of the variable hold circuit 55, which supplies output samples at a rate $2^q.F_s'$, in response to the control signal applied to the control signal input 70. In response to the control signal, it is decided whether the next output sample is obtained by taking over a new input sample or by repenting the previous output sample.

The variable hold circuit 55 function under the influence of a clock signal, eg. $128.F_s'$, internally generated by the receiver.

The conversion process in the variable hold circuit 55 is controlled by the sigma delta modulator 67 in the control loop 57, which is clocked by a crystal oscillator 69 having a oscillation frequency $F_x$. The output signal of the sigma delta modulator 67 is in the form of '+1' and '−1' pulses and is a pulse density modulated version of its input signal. If for instance, the input signal has a DC value of 0.5, then the sigma delta modulator 67 will generate three '+1' pulses and one '−1' pulse, so that on the average $\{3.(+1)+1.(-1)\}/44 = 0.5$.

If the clock frequency of the sigma delta modulator 67 is $F_x$, it will generate $F_x$ pulses in one second. Suppose now that this clock frequency is chosen to be the same as the output sampling frequency of the sampling rate converter, then the output pulses of the sigma delta modulator 67 can be used to control the conversion process. The input signal of the sigma delta modulator 67 is a DC value which is dependent of the input and output sampling frequencies of the sampling rate converter. The variable hold circuit 55 is controlled in such a way by means of the pulses supplied by the sigma delta modulator 67 that a '+1' pulse means that the previous output sample is repeated and that a '−1' pulse means that a new input sample is taken over.

Every second, $64.F_s$ input samples must be converted into $2^q.F_s'$ output samples ($2^q$ will generally be chosen equal to 64 as well, in the present example). When the input sampling frequency of the sample rate converter is smaller than the output sampling frequency of the converter, all input samples of the hold circuit will be used at its output so as to generate the output signal of the hold circuit 55. This means that the sigma delta modulator 67 has to generate $64.F_s$ '−1' pulses in 1 second. The remaining $2^q.F_s'-64.F_s$ output samples are obtained by repeating some of the input samples, such as by holding the previous output sample. Therefore, the sigma delta modulator 67 has to generate $2^q.F_s'-64.F_s$ '+1' pulses in one second.

The receiver may further comprise a noise shaper 72, followed by a DA converter 74 and a lowpass filter 76. The noise shaper 72 and the DA converter 74 also function under the influence of the frequency $128.F_s'$. The noise shaper converts the digital signal applied to its input into a 1-bit bitstream signal having a sampling frequency of $64.F_s'$, which is subsequently DA converted in the converter 74 and filtered in the filter 76 in order to obtain an analog audio signal at the output 80 with a bandwidth of 20 kHz, as an example.

The transmission system as described in the foregoing has the advantage that audio signals of various wordlengths WL and sampling rates, related to $F_s$, can be transmitted via the transmission medium, with the possibility of receiving those signals and converting them to a fixed frequency, related to $F_s'$.

Whilst the invention has been described with reference to preferred embodiments thereof, it is to be understood that these are not limitative examples. Thus, various modifications may become apparent to those skilled in the art, without departing from the scope of the invention, as defined in the claims. Further, the invention lies in each and every novel feature or combination of features.

RELATED DOCUMENTS (D1) U.S. Pat. No. 5,323,396 (PHN 13.241)
(D2) 'A digital decimating filter for analog-to-digital conversion of hi-fi audio signals', by J. J. van der Kam in Philips Techn. Rev. 42, no. 6/7, April 1986, pp. 230–8
(D3) 'A higher order topology for interpolative modulators for oversampling A/D converters', by Kirk C. H. Chao et al in IEEE Trans. on Circuits and Systems, Vol 37, no. 3, March 1990, pp. 309–18
(D4) U.S. Pat. No. 5,225,787 (PHN 13.677)
(D5) 'A method for the construction of minimum-redundancy codes', by D. A. Huffman in Proc. of the IRE, Vol. 40(10), September 1952.
(D6) 'An introduction to arithmetic coding' by G. G. Langdon, IBM J. Res. Develop., Vol. 28(2), March 1984.
(D7) 'A universal algorithm for sequential data compression' by J. Ziv et al, IEEE TRans. on Inform. Theory, Vol. IT-23, 1977.

What is claimed is:

1. Digital transmission system having a transmitter and a receiver for transmitting and receiving a digital audio signal, the digital audio signal being in the form of samples of a specific wordlength and occurring at a specific sampling rate, the transmitter comprising:
  input means for receiving the digital audio signal and for receiving a first information word having a relationship with the specific wordlength and a second information word having a relationship with the specific sampling rate,
  formatting means for combining the digital audio signal and the first and second information words into a serial datastream suitable for transmission via a transmission medium, the wordlength of the samples in the digital audio signal, expressed in number of bits, being equal to n, where n is an integer larger than zero, and the sampling rate being equal to $2^p.F_s$, where p is an integer larger than zero and $F_s$ is equal to a frequency value taken from a group of at least two frequency values, said group of frequency values including 44.1 kHz and 48 kHz.

2. Digital transmission system as claimed in claim 1, wherein $F_s$ is equal to a frequency value taken from a group of at least three frequency values, said group of frequency values including 32 kHz, 44.1 kHz and 48 kHz.

3. Digital transmission system as claimed in claim 1 or 2, wherein the formatting means comprises channel encoding means for channel encoding at least the digital audio signal so as to obtain said serial datastream.

4. Digital transmission system as claimed in claim 1 or 2, wherein the formatting means comprises error correction encoding means for error correction encoding at least the digital audio signal so as to obtain said serial datastream.

5. Digital transmission system as claimed in claim 1 wherein the transmitter further comprises a sigma-delta modulator and at least one lowpass filter and down sampler unit, the sigma-delta modulator being adapted to receive an analog audio signal and for supplying a 1-bit bitstream audio signal in response thereto, the at least one lowpass filter and down sampler unit being adapted to down sample the 1-bit bitstream signal so as to obtain a down sampled digital audio signal, and for supplying the down sampled digital audio signal to the input means.

6. Digital transmission system as claimed in claim 5, wherein the lowpass filter and downsampler unit realizes a down sampling with a factor $2^r$, where r is an integer larger than zero.

7. Digital transmission system as claimed in claim 1, wherein the receiver comprises:
  input means for receiving the serial datastream from the transmission medium,
  retrieval means for retrieving the first and second information words from the serial datastream, for retrieving the digital audio signal from the serial datastream using the first information word,
  sample rate conversion means for converting the sampling rate of the samples in the digital audio signal supplied by the retrieval means from the sampling rate defined by the second information word into a second sampling rate so as to obtain an in sample rate converted digital audio signal, wherein the second sampling rate is equal to $2^q.F_s'$, where q is an integer larger than zero and $F_s'$ is equal to a frequency value taken from a group of at least two frequency values, said group of frequency values including 44.1 kHz and 48 kHz, the samples in said in sample rate converted digital audio signal having a specific wordlength, and output means for supplying the in sample rate converted digital audio signal at said second sampling rate.

8. Digital transmission system as claimed in claim 7, wherein $F_s'$ equals 48 kHz.

9. Digital transmission system as claimed in claim 7 or 8, wherein the receiver further comprises D/A conversion means for converting the in sample rate converted digital audio signal into an analog audio signal.

10. Digital transmission system as claimed in claim 7 wherein the sample rate conversion means comprise:

upsampling means for upsampling the digital audio signal so as to obtain an upsampled digital audio signal having a sampling rate equal to $2^q.F_s$, variable hold means for variably holding the samples of the upsampled digital audio signal so as to obtain the in sample rate converted digital audio signal.

11. Digital transmission system as claimed in claim 7, wherein the input means comprise channel decoding means for channel decoding the serial datastream.

12. Digital transmission system as claimed in claim 7, wherein the input means comprise error correction means for carrying out an error correction step on a signal applied to the input of the error correction means.

13. Receiver for use in a transmission system as claimed in claim 7, characterized by those features in claim 7, or that characterize the receiver.

14. Receiver as claimed in claim 13, wherein the receiver is in the form of a reproducing apparatus for reproducing the serial datastream from a track on a record carrier, the input means further comprising reading means for reading the serial datastream from said track on the record carrier.

15. Transmission system as claimed in claim 7, wherein the transmitter further comprises lossless compression means for carrying out a substantially lossless data compression step on the digital audio signal so as to obtain a data compressed digital audio signal for transmission via the transmission medium, the receiver further comprising lossless expansion means for carrying out a data expansion step on the data compressed digital audio signal in the transmission signal so as to obtain a replica of the digital audio signal.

16. Transmitter for use in a transmission system as claimed in claim 1, characterized by those features in claim 1 that characterize the transmitter.

17. Transmitter as claimed in claim 16, wherein the transmitter is in the form of a recording apparatus for recording the serial datastream in a track on a record carrier, the formatting means further comprising writing means for writing the serial datastream in said track on the record carrier.

18. Record carrier obtained with the transmitter as claimed in claim 17, a serial datastream being recorded in a track on said record carrier, said serial datastream comprising samples of a digital audio signal and a first and a second information word included in said serial datastream, the first information word having a relationship with the wordlength of the samples in said digital audio signal and the second information word having a relationship with the sampling rate of the samples in said digital audio signal, the wordlength of the samples in the digital audio signal, expressed in number of bits, being equal to n, where n is an integer larger than zero, and the sampling rate of the samples in the digital audio signal being equal to $2^p.F_s$, where p is an integer larger than zero and $F_s$ is equal to a frequency value taken from a group of at least two frequency values, said group of frequency values including 44.1 kHz and 48 kHz.

19. Method of transmitting a digital audio signal, the digital audio signal being in the form of samples of a specific wordlength and occurring at a specific sampling rate, the transmission method comprising the steps of:

receiving the digital audio signal receiving a first information word having a relationship with the specific wordlength and a second information word having a relationship with the specific sampling rate, combining the digital audio signal and the first and second information words into a serial datastream suitable for transmission via a transmission medium, the wordlength of the samples in the digital audio signal, expressed in number of bits, being equal to n, where n is an integer larger than zero, and the sampling rate being equal to $2^p.F_s$, where p is an integer larger than zero and $F_s$ is equal to a frequency value taken from a group of at least two frequency values, said group of frequency values including 44.1 kHz and 48 kHz.

20. Transmission signal comprising samples of a digital audio signal and a first and a second information word, the first information word having a relationship with the wordlength of the samples in said digital audio signal and the second information word having a relationship with the sampling rate of the samples in said digital audio signal, the wordlength of the samples in the digital audio signal, expressed in number of hits, being equal to n, where n is an integer larger than zero, and the sampling rate of the samples in the digital audio signal being equal to $2^p.F_s$, where p is an integer larger than zero and $F_s$ is equal to a frequency value taken from a group of at least two frequency values, said group of frequency values including 44.1 kHz and 48 kHz, such that electronic circuitry receiving the transmission signal can be caused to generate a sample rate converted audio signal.

21. A transmitter that for transmitting receiving a digital audio signal, the digital audio signal being in the form of samples of a specific wordlength and occurring at a specific sampling rate, the transmitter comprising:

an input configured to receive the digital audio signal, a first information word having a relationship with the specific wordlength and a second information word having a relationship with the specific sampling rate, formatter that combines the digital audio signal and the first and second information words into a serial datastream suitable for transmission via a transmission medium, the wordlength of the samples in the digital audio signal, expressed in number of bits, being equal to n, where n is an integer larger than zero, and the sampling rate being equal to $2^p.F_s$, where p is an integer larger than zero and $F_s$ is equal to a frequency value taken from a group of at least two frequency values, said group of frequency values including 44.1 kHz and 48 kHz.

22. Digital transmission system having a transmitter and a receiver for transmitting and receiving a digital audio signal, the digital audio signal being in the form of samples of a specific wordlength and occurring at a specific sampling rate, the transmitter comprising:

an input device configured to receive the digital audio signal, a first information word having a relationship with the specific wordlength and a second information word having a relationship with the specific sampling rate, a formatter that combines the digital audio signal and the first and second information words into a serial datastream suitable for transmission via a transmission medium, the wordlength of the samples in the digital audio signal, expressed in number of bits, being equal to n, where n is an integer larger than zero, and the sampling rate being equal to $2^p.F_s$, where p is an integer larger than zero and $F_s$ is equal to a frequency value taken from a group of at least two frequency values, said group of frequency values including 44.1 kHz and 48 kHz;

wherein the receiver comprises:

an input device that receives the serial datastream from the transmission medium, a retrieval mechanism that retrieves the first and second information words from the serial datastream, and that retrieves the digital audio signal from the serial datastream using the first information word, a sample rate converter that converts the sampling rate of the samples in the digital audio signal supplied by the retrieval mechanism from the sampling rate defined by the second information word into a second sampling rate so as to obtain an in sample rate converted digital audio signal, wherein the second sampling rate is equal to $2^q.F_s'$, where q is an integer larger than zero and $F_s'$ is equal to a frequency value taken from a group of at least two frequency values, said group of frequency values including 44.1 kHz and 48 kHz, the samples in said in sample rate converted digital audio signal having a specific wordlength, and an output device that supplies the sample rate converted digital audio signal at said second sampling rate.

23. A record carrier comprising:

a serial datastream being provided in a track on said record carrier, said serial datastream comprising samples of a digital audio signal and a first and a second information word included in said serial datastream, the first information word having a relationship with the wordlength of the samples in said digital audio signal and the second information word having a relationship with the sampling rate of the samples in said digital audio signal, the wordlength of the samples in the digital audio signal, expressed in number of bits, being equal to n, where n is an integer larger than zero, and the sampling rate of the samples in the digital audio signal being equal to $2^p.F_s$, where p is an integer larger than zero and $F_s$ is equal to a frequency value taken from a group of at least two frequency values, said group of frequency values including 44.1 kHz and 48 kHz.

* * * * *